Aug. 17, 1948.  C. J. WADSWORTH  2,447,378
ROAD SIGNAL DEVICE OR THE LIKE
Filed Feb. 3, 1947  2 Sheets-Sheet 1
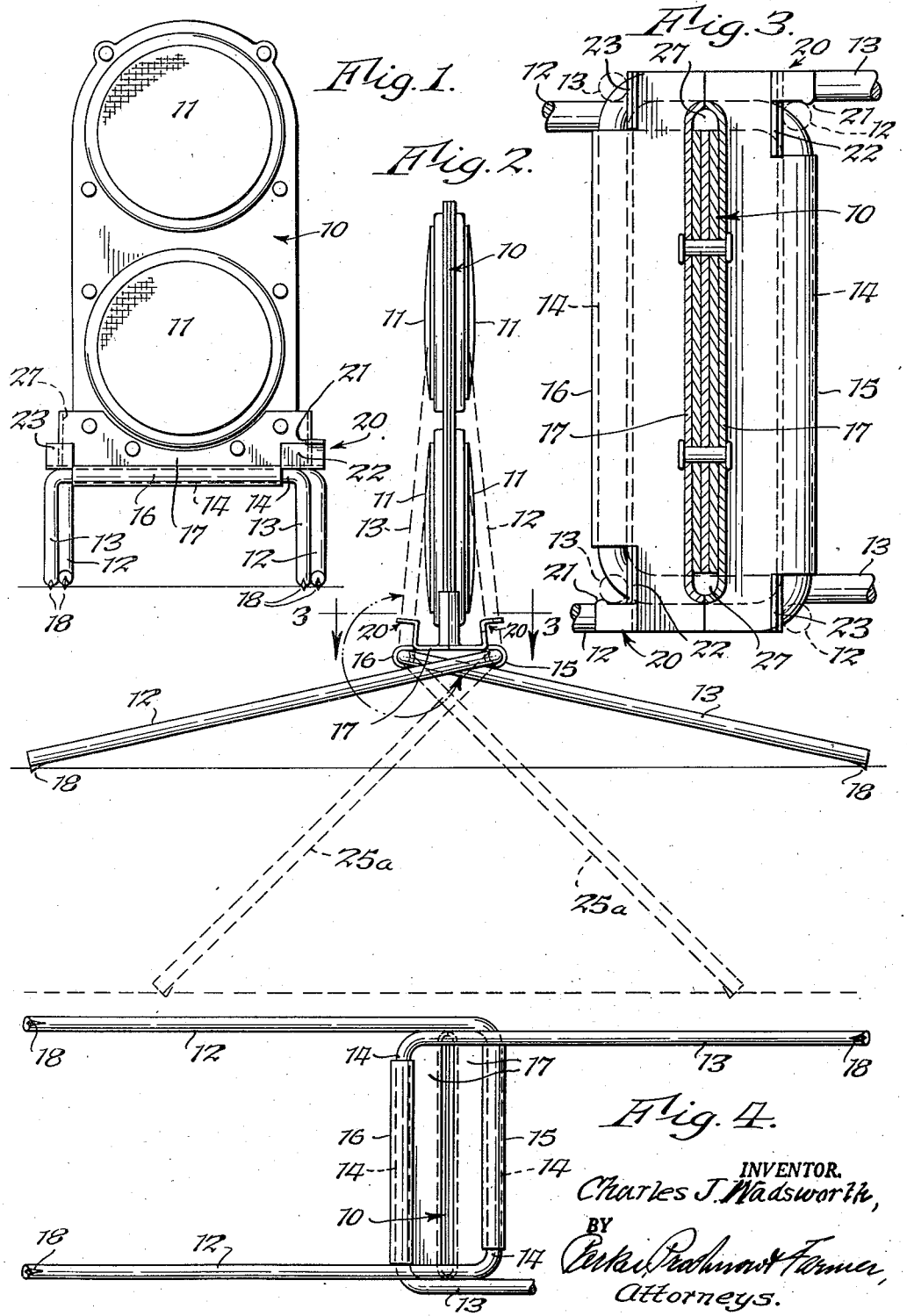
INVENTOR.
Charles J. Wadsworth,
BY
Attorneys.

Aug. 17, 1948.  C. J. WADSWORTH  2,447,378
ROAD SIGNAL DEVICE OR THE LIKE
Filed Feb. 3, 1947  2 Sheets-Sheet 2

INVENTOR.
Charles J. Wadsworth,
BY
Parker, Prothnow Farmer,
Attorneys.

Patented Aug. 17, 1948

2,447,378

UNITED STATES PATENT OFFICE 2,447,378

ROAD SIGNAL DEVICE OR THE LIKE

Charles J. Wadsworth, Nutley, N. J., assignor to
R. E. Dietz Company, New York, N. Y.

Application February 3, 1947, Serial No. 726,005

10 Claims. (Cl. 248—33)

This invention relates to signalling devices and the like, and more especially to improvements in portable signalling devices of the road reflector type that are adapted to be placed in operative position on a road or highway to warn the drivers of approaching motor vehicles of the presence, for instance, of a parked truck or other traffic hazard or workmen on the road, as a safety precaution for the prevention of accidents. Such signalling devices may comprise a signalling panel, frame or member carrying or supporting one or more light reflecting or refracting elements adapted to be illuminated by the lights of an approaching vehicle, or signalling means of any other desired type, and means for supporting said signalling member in upright position wherever desired; and preferably such signalling devices are made of a construction adapting them to be folded or collapsed into convenient condition for their storage or transportation, as in motor trucks, said devices having parts adapted to be readily moved from the folded or collapsed conditions to operative positions for supporting the devices in the intended position on the road or other supporting surface.

One object of my invention is to provide a signalling device, or device suitable for such purposes as mentioned, which is of practical and desirable novel construction.

Other objects of the invention are to provide a device of the sort mentioned which is of simple and economical improved construction adapting it to be folded or collapsed into compact condition and having supporting members capable of being easily and quickly moved from the inoperative or folded positions to operative positions in which they will support the device stably and securely in its intended operative position under varying weather and road conditions; which has supporting legs or members that can be readily moved from their inoperative to their operative positions and will be securely retained in the operative positions without the necessity for additional parts or means for latching or securing them in their operative supporting positions; in which the supporting members, when in operative position, function to support the signalling member off of or above the road or supporting surface, and so that the device offers the minimum obstruction to the passage of wind past the same so as to lessen the liability of the device being blown out of the intended operative position by strong winds; which includes simple means for releasably retaining the supporting members in their folded positions; and in which the supporting members are adapted to be releasably held in different adjusted positions for supporting the main or signalling member of the device at different desired heights above the road or supporting surface.

Further objects and advantages of the invention will appear from the following specification of the preferred embodiments of the invention shown in the accompanying drawings, and the novel features of the invention are set forth in the appended claims.

In said drawings:

Fig. 1 is an elevation of a signalling device or the like embodying my invention, showing a face view of the same in operative position.

Fig. 2 is a side or edge elevation thereof showing the same in operative position by solid lines, and indicating by broken lines both the folded and partially opened positions of the supporting members.

Fig. 3 is a broken sectional plan thereof on a larger scale on line 3—3, Fig. 2.

Fig. 4 is a bottom plan view of the device in its open or operative condition.

Figure 5:
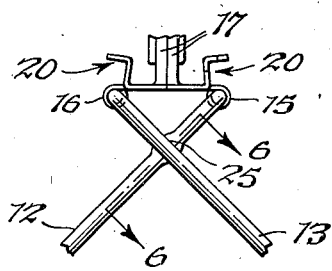
Fig. 5 is a fragmentary side or edge elevation showing a slight modification of the invention in which the supporting legs or members releasably interengage for holding them in partly opened, operative supporting positions.

The signalling device comprises a main panel, frame or member 10 which may be provided on one or both of its opposite, or front and rear faces with signalling or indicating means 11, and supporting legs or members 12 and 13 which are hinged or connected to the main member 10 so as to be movable from operative positions in which they support the main member in upright position, to collapsed or folded positions in which they extend lengthwise beside or adjacent the main member. The invention is not concerned with the type, construction or arrangement of the signalling elements or means 11, and these may consist of one or more light reflecting or refracting lenses of known character adapted to reflect or refract light from an approaching vehicle, or they may be signalling or indicating means of any sort adapted to function as safety or warning signals or as indicators for any other purpose.

Referring first to the device illustrated in Figs. 1-4, the supporting members 12, 13 for the main or panel member preferably comprise oppositely disposed pairs of legs which are hinged to the lower end portion of the main panel or member at opposite sides of the plane thereof, so that each pair of legs can be swung from a folded position at one side of and extending up lengthwise of or beside the panel 10 through an angle of approximately 270 degrees, to a supporting position in which the pair of legs extends beneath the panel member and is adapted to rest on the road or other supporting surface at the opposite side of the plane of the panel member. In the preferred construction shown, each supporting member 12, 13 is formed by a rod or wire bent into substantially U-shape to provide spaced parallel legs connected by a cross bar 14 at their inner ends. The cross bar 14 of one pair of legs 12 is hinged in a bearing sleeve or part 15 extending parallel with the plane of the main panel 10 at one side of its lower end, and the cross bar of the other pair of legs 13 is similarly hinged in a parallel bearing sleeve or part 16 at the opposite side of the main panel. The bearing sleeves can be conveniently formed by tubular parts of similar angle-shaped hinge strips 17 riveted on the lower end portion of the main panel 10 at opposite faces thereof. One pair of legs, 12 for instance, can be swung from a folded position, indicated by broken lines in Fig. 2 in which the legs extend upwardly at the right hand side or face of the main panel downwardly through an arc of approximately 270 degrees to the supporting position shown, in which this pair of legs extends from its hinge bearing 15 beneath and beyond the left hand side of the main panel. Similarly, the second pair of legs 13 can be swung from the upwardly extending folded position at the left hand side of the main panel, as shown by broken lines in Fig. 2, downwardly through approximately 270 degrees to the operative position shown, in which this pair of legs extends from its hinge bearing 16 at the left hand side of the main panel beneath the latter and outwardly to the right hand side thereof. Thus, the two pairs of legs when in operative supporting position, will extend in downwardly and oppositely inclined crossing positions beneath the main panel with each pair of legs engaging or abutting upwardly between its inner and outer ends against a relatively fixed part of the device, whereby the outer ends of the legs will be held from upward movement away from the supporting position, and the legs will provide a supporting base for the device without the necessity for any latching or securing means for holding the legs in their operative supporting positions. In the device constructed as shown in Figs. 1 to 4, the two U-shaped supporting members are duplicates and of like width, or having their parallel legs equally spaced, and they are hinged on the panel member in offset relation to each other, so that one leg of each pair is disposed between the legs of the other pair when the legs are in their supporting positions. With this arrangement, one leg of each pair is adapted to abut upwardly against the overlying end portion of the cross bar 14 of the other pair of legs to prevent the upward movement of the legs out of supporting position. The same result could, however, be effected by upward engagement of each supporting member with another relatively fixed part at the base portion of the panel member.

The supporting legs or members thus support the main or panel member 10 spaced above or off of the road or supporting surface a distance dependent upon the inclination of the legs when in the supporting position, in which they bear upwardly against their stop abutments. Since the legs of each pair are slender and spaced from each other, preferably a distance substantially equal to the width of the panel member, and the latter is held raised off of the ground or road surface, the device when in operative position offers the minimum resistance to wind currents which can flow through this skeleton supporting base and beneath the panel member. Therefore, the device will remain in the intended upright position even in strong or severe winds. The outer ends of the legs may be punched or formed so as to provide relatively sharp points or claws 18 adapted to enter or dig into the road surface or other supporting surface, and act to prevent the device from being shifted on the supporting surface, as by wind pressure. The supporting legs or members may be of a length approximately equal to the height of the main or panel member 10 of the device so that they will afford ample support, and yet when in folded position, will not extend substantially beyond the upper end of the main panel, and thus will not substantially increase the overall length or height dimension of the device when in its collapsed or folded condition.

The signalling device is preferably provided at its lower end portion with holding fingers 20 which are adapted to engage the supporting legs or members 12, 13, when folded for releasably retaining them in their folded positions. As shown, these holding fingers are formed by upwardly and outwardly bent parts of the hinge strips 17 located at diametrically opposite corners of the base of the panel member, and these fingers have lateral projecting rounded nibs or tips 21 past which the adjacent legs of the supporting members are adapted to be sprung when folding the legs, and which nibs engage and hold the legs in their upper folded positions. The upright portions 22 of the holding fingers, and upbent parts 23 of the hinge strips at the remaining corners of the panel base function as stops to engage and limit the folding movement of the supporting legs to prevent them from being moved inwardly beyond their intended substantially upright folded positions.

Figure 6:
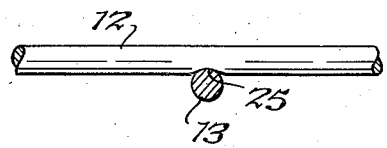
Fig. 6 is an enlarged section on line 6—6, Fig. 5.

In the modified form of the device shown in Figs. 5 and 6, one leg of each pair is provided or formed with an indentation or part arranged for engagement with the adjacent leg of the other pair when the legs are swung to a crossing position, such as indicated in Fig. 5, and by the broken lines 25a in Fig. 2. As shown in Figs. 5 and 6, one leg of each pair of legs 12, 13 is made with a depression 25 into which the adjacent one of the other pair 13 is adapted to seat and be releasably retained by the inherent resilience or spring action of the legs for releasably retaining the legs in the crossed position shown. Instead of the depression 25 shown, one or both of the legs could be provided with spaced humps adapted similarly to releasably hold the legs in a particular crossed position, and by providing the depressions or humps at different points along the lengths of the legs, the legs can be releasably retained in different crossed positions more or less inclined to the vertical. In this way, the panel member, if desired for any reason, can be supported upright at a greater or less distance above the supporting surface, and so give the device greater or less height when in operative position.

Figure 7:
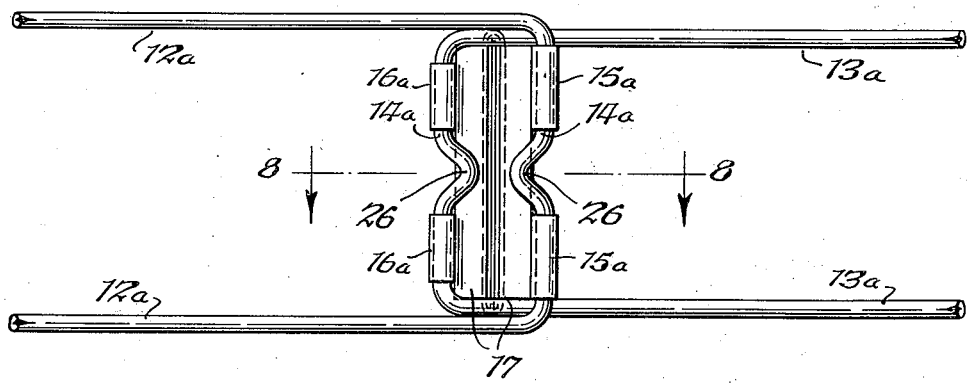
Fig. 7 is a bottom plan view of another modified embodiment of the invention, showing the opened, operative positions of the supporting members.
Figure 8:
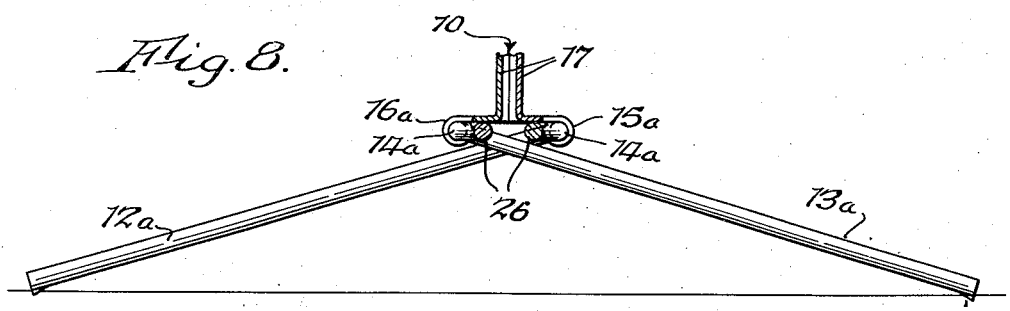
Fig. 8 is a fragmentary side elevation thereof.

Figs. 7 and 8 show another modified form of the signalling device in which the legs of one U-shaped supporting member, as 12a, are spaced farther apart than the legs of the other U-shaped member 13a, and the legs of the first member are adapted to straddle those of the second member when the members are moved to their crossed supporting positions. The cross bars 14a of the U-shaped legs in this form of the device may be made with out-bent offset portions 26 between their ends arranged to abut upwardly against the bottom of the base portion of the panel member, as shown in Figs. 7 and 8, to prevent upward movement of the outer ends of the legs out of their panel-supporting positions. The hinge bearing sleeves 15a and 16a in this device may be removed to afford spaces in which the offset parts 26 of the cross bars of the legs can move in the folding and opening movements of the supporting legs or members. Otherwise this modification can be of substantially the construction first described.

In the signalling device as shown in Figs. 1 to 3, the hinge strips 17 for the supporting legs or members 12, 13, may have their ends extended beyond the side edges of the main portion of the panel member 10 and bent towards each other, and thereby form sockets 27 adapted to receive and support the staffs of flanges or other elements at opposite edges of the panel member for use as daylight signals.

I claim as my invention:

1. A signal device or the like comprising a main member having signalling means and adapted to occupy a standing position, supporting members therefor hinged at one end to the lower portion of said main member at opposite sides of the plane thereof to swing from upwardly extending folded positions adjacent said main member to supporting positions in which each supporting member extends from its hinge connection at one side of said main member transversely below said main member to the opposite side thereof and rests at its free end on a supporting surface for supporting said main member in standing position off of said supporting surface, and means constituting parts of said device which releasably retain said supporting members in their said supporting positions.

2. A signal device or the like comprising a main member having signalling means and adapted to occupy a standing position, and supporting members therefor hinged at one end to the lower portion of said main member at opposite sides of the plane thereof to swing from upwardly extending folded positions adjacent said main member to supporting positions in which each supporting member extends from its hinge connection at one side of said main member transversely below said main member to the opposite side thereof and rests at its free end on a supporting surface for supporting said main member in standing position off of said supporting surface, said device including abutments which engage said supporting members and resist upward movement of the free ends of said supporting members from their supporting positions.

3. A signal device or the like comprising a main member having signalling means and adapted to occupy a standing position, supporting members therefor movably connected at one end with said main member adjacent the lower end thereof to move from inoperative positions in which they extend upwardly beside opposite sides of said main member to supporting positions in which they extend transversely beneath said main member to opposite sides thereof to rest on a supporting surface for supporting said main member in standing position, and relatively fixed abutments on said device which bear downwardly against said supporting members between their ends and oppose upward movement of the outer ends of said supporting member from their supporting positions.

4. A signal device or the like comprising a main member having signalling means and adapted to occupy a standing position, and supporting members therefor each having a pair of spaced legs and hinged at one end to the lower portion of said main member at opposite sides thereof to swing from upwardly extended folded positions adjacent said main member to supporting positions in which they extend in opposite downwardly inclined crossing positions below said main member and rest at their free ends on a supporting surface for supporting said main member in standing position off of said surface, said device having parts which engage said supporting members and resist upward movement of the free ends of said supporting members from their supporting positions.

5. A signal device or the like comprising a main member having signalling means and adapted to occupy a standing position, and substantially U-shaped supporting members hinged at their inner ends to the lower portion of the main member at opposite sides of the plane thereof to swing from folded upstanding positions at opposite sides of said main member to supporting positions in which they extend from their hinge connections in opposite downwardly inclined crossing positions below the lower end of said main member with their outer ends resting on a supporting surface, said device including means which engage said supporting members and resist upward movement of the outer ends of said members from their supporting positions.

6. A signal device or the like comprising a signalling panel adapted to occupy a standing position, supporting members therefor hinged to the lower portion of said panel at points offset to opposite sides of the plane of said panel to swing from upwardly extending folded positions adjacent said panel to panel supporting positions in which each supporting member extends beneath the lower end of said panel from its hinge connection at one side of the panel to the opposite side thereof and rests at its free end on a supporting surface for supporting said panel in upright position off of said supporting surface, and abutment means carried by said panel which bear downwardly on said supporting members and resist upward movement of the free ends of said supporting members from their supporting positions.

7. A signal device or the like comprising a signalling panel adapted to occupy a standing position, hinge pieces projecting outwardly from the lower end portion of said panel at opposite sides thereof, and a pair of substantially U-shaped supporting members each having a pair of spaced legs connected by a cross bar at their inner ends, and hinged by said cross bars to said hinge pieces to swing from upwardly extended folded positions adjacent said panel to supporting positions in which they extend in opposite directions under the lower end of said panel with each supporting member extending from its hinge piece at one side of the panel beyond the opposite side of the panel, each of said supporting members when in supporting position engaging a hinge part for the other member to resist upward movement of the outer ends of said supporting members from their supporting positions.

8. A signal device or the like comprising a signalling panel adapted to occupy a standing position, and a pair of substantially U-shaped supporting members each having a pair of spaced legs connected by a cross bar at their inner ends, and hinged by said cross bars to the lower end portion of said panel at opposite sides of the panel plane to swing from upwardly extended folded positions adjacent said panel to supporting positions in which they extend in opposite directions under the lower end of said panel with each supporting member extending from its hinge at one side of the panel beyond the opposite side of the panel, each of said supporting members when in its supporting position bearing upwardly against a part at the lower end of said panel to hold said supporting members against upward movement out of their supporting positions.

9. A signal device or the like according to claim 8, including fingers on said panel which said supporting members engage in their folded positions for releasably holding the supporting members folded.

10. A signal device or the like comprising a signalling panel adapted to occupy a standing position, hinge pieces projecting outwardly from the lower end portion of said panel at opposite sides thereof, and a pair of substantially U-shaped supporting members each having a pair of spaced legs connected by a cross bar at their inner ends, and hinged by said cross bars to said hinge pieces to swing from upwardly extended folded positions adjacent said panel to supporting positions in which they extend beneath the lower end of said panel in opposite downwardly inclined crossing positions, said supporting members having parts which interengage where the members cross, for releasably holding said members in said crossed supporting positions.

CHARLES J. WADSWORTH.

REFERENCES CITED

The following references are of record in the file of this patent:

UNITED STATES PATENTS

| Number | Name | Date |
|---|---|---|
| 2,235,280 | Carver | Mar. 18, 1941 |